(12) United States Patent
Green

(10) Patent No.: US 7,079,987 B2
(45) Date of Patent: Jul. 18, 2006

(54) TUNABLE FILTER DEVICE FOR SPATIAL POSITIONING SYSTEMS

(75) Inventor: Francisco R. Green, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 116 days.

(21) Appl. No.: 11/010,468

(22) Filed: Dec. 13, 2004

(65) Prior Publication Data

US 2005/0114074 A1 May 26, 2005

Related U.S. Application Data

(63) Continuation of application No. 10/341,571, filed on Jan. 13, 2003.

(51) Int. Cl.
*H04B 15/00* (2006.01)

(52) U.S. Cl. ................................. 702/190; 702/191

(58) Field of Classification Search ................ 702/122, 702/123, 126, 189, 191, 193, 195, 197, 198; 455/173.1, 176.1, 177.1, 178.1, 180.1, 182.1, 455/183.2, 184.1, 185.1, 186.1, 188.1, 190.1, 455/192.1, 192.3, 193.1, 1, 84, 278.1, 296; 380/258; 342/357.01, 357.02, 357.12, 357.06, 342/357.13; 375/295, 296, 302, 316, 344, 375/345, 346, 350
See application file for complete search history.

(56) References Cited

U.S. PATENT DOCUMENTS

| | | | |
|---|---|---|---|
| 3,968,361 A | 7/1976 | Bumgardner | |
| 4,348,586 A | 9/1982 | Kokorowski | |
| 4,851,660 A | 7/1989 | Juds et al. | |
| 5,125,108 A * | 6/1992 | Talwar | 455/278.1 |
| 5,302,968 A * | 4/1994 | Heberle | 345/671 |
| 5,343,033 A | 8/1994 | Cain | |
| 5,404,161 A | 4/1995 | Douglass et al. | |
| 5,428,831 A * | 6/1995 | Monzello et al. | 455/296 |
| 5,471,049 A | 11/1995 | Cain | |
| 5,486,690 A | 1/1996 | Ake | |
| 5,612,779 A | 3/1997 | Dunne | |
| 5,652,651 A | 7/1997 | Dunne | |
| 5,712,641 A * | 1/1998 | Casabona et al. | 342/362 |
| 5,734,300 A | 3/1998 | Yoder | |
| 5,774,829 A * | 6/1998 | Cisneros et al. | 701/213 |
| 5,864,311 A | 1/1999 | Johnson et al. | |
| 5,872,540 A * | 2/1999 | Casabona et al. | 342/362 |
| 5,946,081 A | 8/1999 | Lai et al. | |
| 6,122,605 A | 9/2000 | Drees et al. | |
| 6,301,550 B1 | 10/2001 | Okamoto et al. | |
| 6,370,485 B1 | 4/2002 | Kawata et al. | |
| 6,415,001 B1 | 7/2002 | Li et al. | |
| 6,590,528 B1 * | 7/2003 | DeWulf | 342/357.12 |
| 6,594,613 B1 * | 7/2003 | Ley et al. | 702/140 |
| 6,639,541 B1 * | 10/2003 | Quintana et al. | 342/18 |
| 6,861,983 B1 * | 3/2005 | Casabona et al. | 342/420 |
| 2002/0136288 A1 | 9/2002 | McCarty, Jr. | |
| 2004/0012526 A1 * | 1/2004 | Casabona et al. | 342/428 |
| 2004/0164900 A1 * | 8/2004 | Casabona et al. | 342/420 |

FOREIGN PATENT DOCUMENTS

WO     WO 96/22509     7/1996

* cited by examiner

*Primary Examiner*—Carol S. W. Tsai
(74) *Attorney, Agent, or Firm*—Dinsmore & Shohl LLP

(57) ABSTRACT

A device for spatial positioning systems includes a programmable measurement filter that is dynamically tuned by the device signal processing unit. The signal processing unit analyzes available data including the measurement signal to determine the likelihood that a detected measurement comprises true device movement and adjusts the measurement filter bandwidth accordingly.

29 Claims, 10 Drawing Sheets

TUNABLE FILTER DEVICE FOR SPATIAL POSITIONING SYSTEMS

CROSS REFERENCE TO RELATED APPLICATIONS

This application is a continuation of U.S. patent application Ser. No. 10/341,571 filed Jan. 13, 2003.

BACKGROUND OF THE INVENTION

The present invention relates in general to devices such as receivers and sensors for spatial positioning systems and in particular to devices for spatial positioning systems having tunable measurement filters.

Spatial positioning systems provide a convenient tool for taking accurate measurements such as distance, angle, or position. Basically, one or more transmitters emit signals that are detected by a receiver deployed about a work site. The receiver processes the emitted signals and determines a measurement therefrom. Alternatively, some devices for spatial positioning systems, such as certain tilt sensors, derive measurements without the need for a separate transmitter. In either respect, the determined measurement signals are typically output to a display or provided as a feedback signal to a control system. The flexibility and accuracy of spatial positioning systems has made such systems suitable for use in a number of diverse applications including for example, building and general construction, earthmoving, surveying, navigating, vessel and structure placement and other applications where it is desirable to accurately take measurements.

Presently, receivers for spatial positioning systems provide signal conditioning and filtering to improve the reliability of measurements taken thereby. However, the receiver filter operates on a 'one-size' fits all approach regardless of application or environment. While fixed filter receivers may be satisfactory for removing noise under some conditions, there are situations where a fixed filter receiver may not provide optimal results. For example, operating environments may have drastically different and dynamically changing noise levels due to beam bounce, electrical interference, weather conditions, such as gusts of wind, and operational conditions, such as vibration and operator handling. A receiver having a filter tuned properly to filter out noise due to a relatively high frequency vibration may be ineffective at filtering relatively low frequency noise resulting from beam bounce. However, a filter that is suitable for filtering relatively low frequency noise, such as produced by beam bounce, may have excessive lag that makes the processing delay due to the filter performance impractical, such as for real-time control operations.

SUMMARY OF THE INVENTION

The present invention overcomes the disadvantages of previously known devices for spatial positioning systems by providing a device having a programmable measurement filter that is automatically and dynamically tuned during operation. The measurement filter is dynamically tuned for example, to enhance measurement performance by reducing noise, jitter and other undesirable signals that would otherwise adversely affect a measurement taken by the device. The device is further preferably capable of manipulating a measurement taken by the measurement filter to produce a suitably formatted measurement output signal, whether the measurement output signal is intended for a display or an automated control application communicably coupled to the device.

According to an embodiment of the present invention, a programmable measurement filter is dynamically and automatically tuned to behave as a filter having a relatively high bandwidth to allow quick response tracking of true device movements and as a relatively lower bandwidth filter to attenuate noisy feedback. For example, the programmable measurement filter is automatically tuned to implement a low pass filter function having a first relatively high cutoff frequency when the device detects true device movement. The programmable measurement filter is automatically tuned to implement a low pass filter function having a second, relatively lower cutoff frequency to attenuate noise.

According to another embodiment of the present invention, a device is provided having a programmable measurement filter that is dynamically and automatically tuned to behave as a filter having a predetermined maximum bandwidth to allow quick response tracking of true device movements, a filter having a predetermined minimum bandwidth filter to attenuate noisy feedback, and as a filter having a bandwidth somewhere between the maximum bandwidth and the minimum bandwidth depending upon predetermined conditions. Tuning between the maximum and minimum bandwidths may be accomplished either continuously or in discrete steps. Tuning of the measurement filter may be accomplished based upon any desired criteria. For example, the programmable measurement filter may be programmed to have a filter bandwidth that varies somewhere between a filter bandwidth minimum and maximum depending upon the likelihood that true device movement is being measured compared to noise.

According to an embodiment of the present invention, a device automatically and dynamically filters a measurement signal using a two-pole IIR (infinite impulse response) digital filter that is tuned in software to produce a signal suitable for display output and/or for control systems. By analyzing available data, the device tunes the filter to present a lower or higher bandwidth system within some pre-defined range of operation depending upon the application and needs of the device operator.

According to yet another embodiment of the present invention, a device includes a programmable measurement filter that is dynamically and automatically tuned during operation. By analyzing available data, a tuning signal is generated. The tuning signal is used to automatically tune the programmable measurement filter. The tuning signal may be further provided for example, as a feedback signal to a control system. Alternatively, both the tuning signal and a measurement signal filtered by the programmable measurement filter may be provided as feedback signals to a control system.

The programmable measurement filter according to various embodiments of the present invention may be adapted to filter any spatial positioning measurement signal including for example, angular measurements, acceleration measurements, detected laser signals, detected global positioning signals and detected automated tracking system signals. Also, the programmable measurement filter may be implemented in either the analog or digital domains. For example, the programmable measurement filter may be implemented digitally in software executable by a signal processing unit of the device. Further, the programmable measurement filter output may be coupled either to a display device or to a control device. The display or control unit may be integral with the device, or alternatively, the device may communicate an output based upon the filtered measurement signal to a remote display or control unit.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which are shown by way of illustration, and not by way of limitation, specific preferred embodiments of the invention. It is to be understood that other embodiments may be utilized and that logical, mechanical and electrical changes may be made without departing from the spirit and scope of the present invention.

Figure 1:
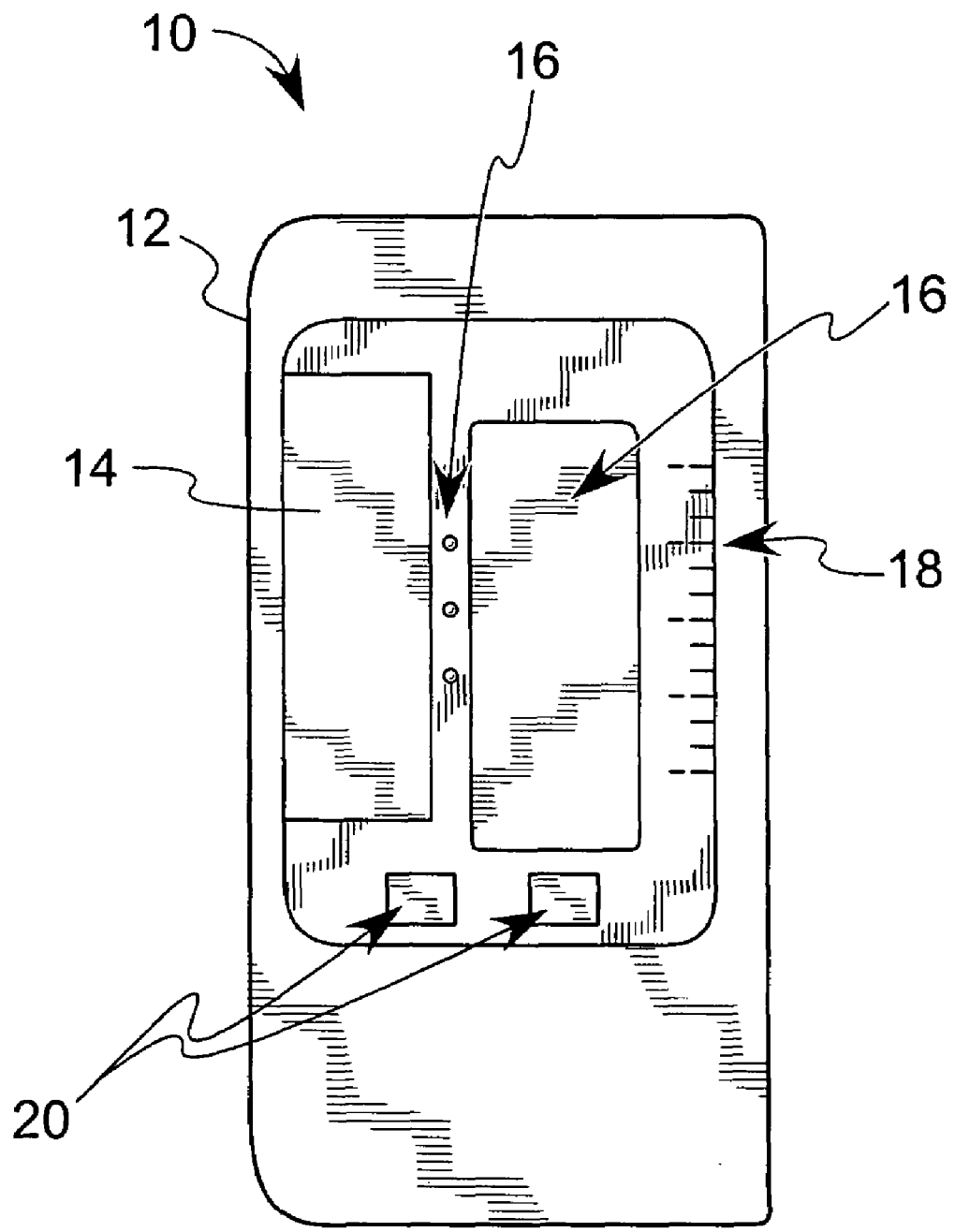
FIG. 1 is a front view of an exemplary device for a spatial positioning system.

Referring to FIG. 1, an exemplary device 10 for a spatial positioning system according to an embodiment of the present invention is illustrated. The device 10 includes a housing 12, a detector 14, one or more display devices 16, optional indicia 18 and one or more optional input devices 20. The detector 14 typically comprises one or more sensors adapted to sense a signal emitted by a corresponding transmitter. The display devices 16 can include any number of visual indicators such as light emitting diodes (LEDs), liquid crystal displays (LCDs) or other screen based displays configured to convey measurement information determined by the device to the user. The term display device is further to be interpreted broadly to include an audible indicator, as well. For example, the device 10 may include a speaker or other sound producing device adapted to convey measurement information audibly. Although the display devices 16 are illustrated as integral with the housing 12 in FIG. 1, the display devices may be optional altogether, or may be remotely coupled to the device 10, such as may be desirable for remote operation. The indicia 18 is provided for example, to display scale markings, instructions or other information to a user. Also, the optional input devices 20 may include switches, buttons, knobs, sliders or other devices provided to allow an operator to input operational information or instructions into the device 10. The device 10 may also optionally include connectors and mounting hardware to interface the device with external devices including for example, rods, displays and control devices (not shown).

Figure 2A:
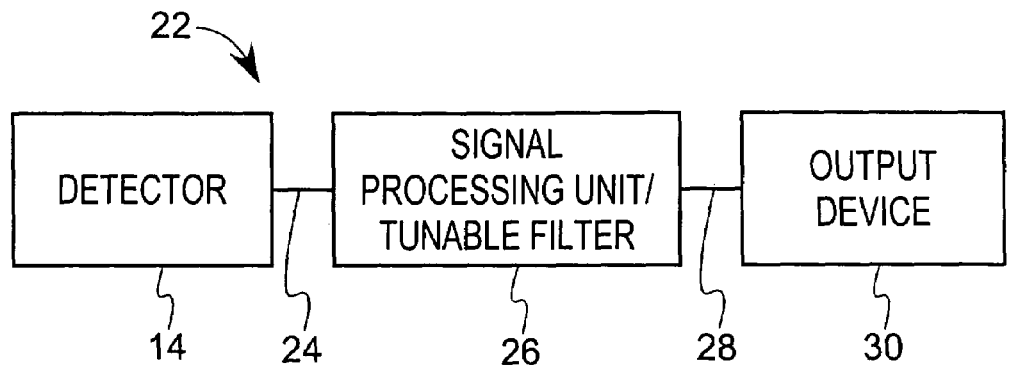
FIG. 2A is a block diagram of a device according to an embodiment of the present invention.
Figure 2B:
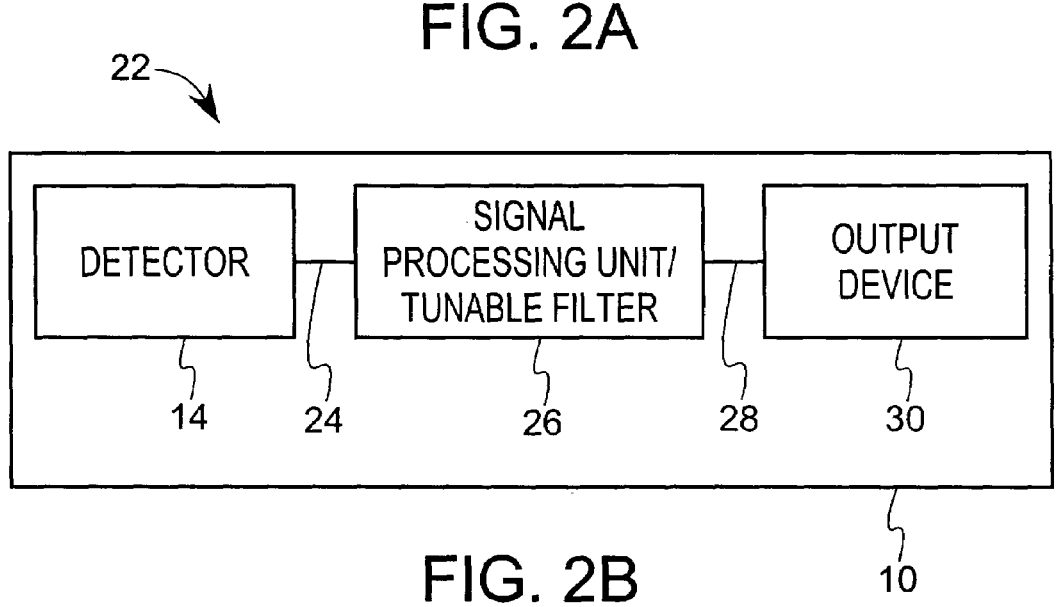
FIG. 2B is a block diagram of a device according to an embodiment of the present invention illustrating a detector, signal processing unit and output device coupled together in an integrated housing.

Referring to FIG. 2A, a basic block diagram 22 of a device according to an embodiment of the present invention is illustrated. The detector 14 detects and outputs a measurement signal 24 that is communicably coupled to a signal processing unit 26. The signal processing unit 26 analyzes and processes the measurement signal 24 and produces an output signal 28 that is communicably coupled to an output device 30. Referring to FIG. 2B, the device 10 according to an embodiment of the present invention includes the detector 14 adapted to communicably couple the measurement signal 24 to the signal processing unit 26. The signal processing unit 26 is adapted to communicably couple the output signal 28 to the output device 30. The detector 14, signal processing unit 26 and output device are arranged as an integral unit, for example, in a housing 12 such as that described with reference to FIG. 1.

When referring to the expression "communicably coupled" herein, it is meant that a signal is either directly connected between the source and destination, or the signal may be optionally coupled through one or more intermediate processes. For example, the measurement signal 24 output by the detector 14 may be directly connected to the signal processing unit 26, or the measurement signal 24 may be processed by intermediate hardware and/or software prior to reaching the signal processing unit 26. As such, the signal processing unit 26 may actually receive a modified version of the measurement signal 24. For example, the measurement signal 24 may be passed through an analog to digital converter, buffer, current or voltage converter and/or other signal processing hardware or software.

Further, the term communicably coupled is to be interpreted expansively to include any manner of communicating information including unidirectional and/or bidirectional communication. For example, communication may be accomplished by direct electrical or optical connection, coupling through induction, wired or wireless links such as a radio link, serial link or other communications protocols. For example, the measurement signal 24 output by the detector 14 may be coupled to a radio link or other wireless communications device. Under such an arrangement, the signal processing unit 26 will likely include the necessary capability to receive the measurement signal 24 transmitted at the detector 14. Alternatively, the measurement signal 24 may be processed by signal conditioning electronics in hardware or software prior to reaching the signal processing unit 26. Thus the measurement signal 24 generically refers to the output of the detector 14 either directly, or as modified by intermediate processes prior to being filtered by the measurement filter.

Figure 2C:
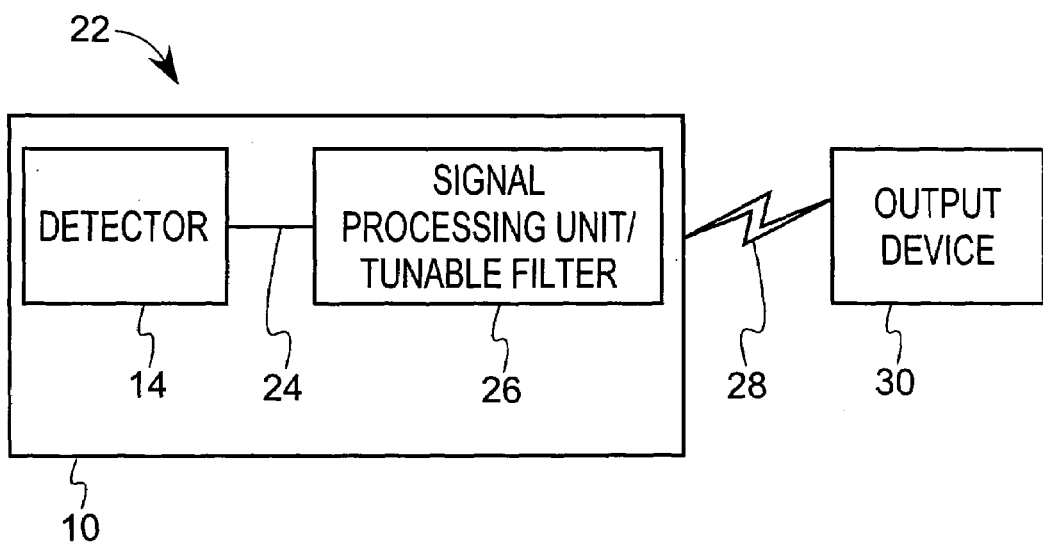
FIG. 2C is a block diagram of a device according to an embodiment of the present invention illustrating a detector and signal processing unit incorporated into a housing that is communicably coupled to a remotely positioned output device.
Figure 2D:
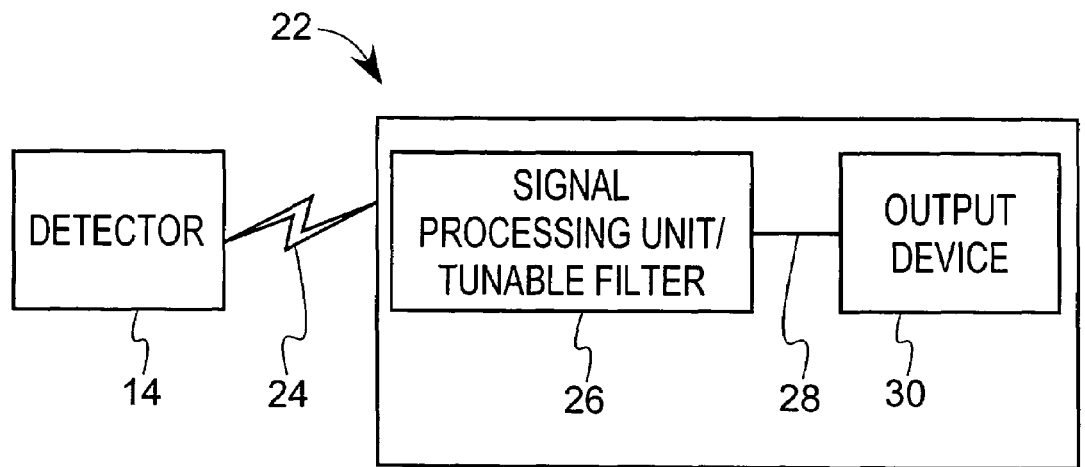
FIG. 2D is a block diagram of a device according to an embodiment of the present invention illustrating a signal processing unit and output device incorporated into a housing that is communicably coupled to a remotely positioned detector.

Referring to FIG. 2C, a device 10 according to one embodiment of the present invention includes a detector 14 adapted to communicably couple the measurement signal 24 to the signal processing unit 26 where the detector 14 and signal processing unit 26 are provided in an integrated assembly. The signal processing unit 26 communicably couples the output signal 28 to a remotely positioned output device 30, such as by a wired or wireless communications link. Referring to FIG. 2D, the device 10 according to an embodiment of the present invention may alternatively include the signal processing unit 10 and the output device 30 in an integrated assembly. The detector 14 is remotely positioned relative to the device 10 and is adapted to communicate the measurement signal 24 to the device, such as through a wired or wireless communications link.

Figure 2E:
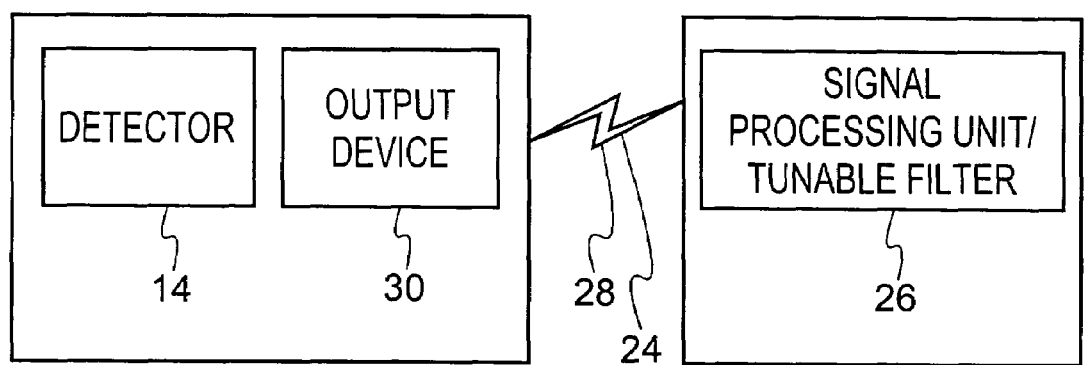
FIG. 2E is a block diagram of a device according to an embodiment of the present invention illustrating a detector and an output device incorporated into a housing that is communicably coupled to a remotely positioned signal processing unit.
Figure 2F:
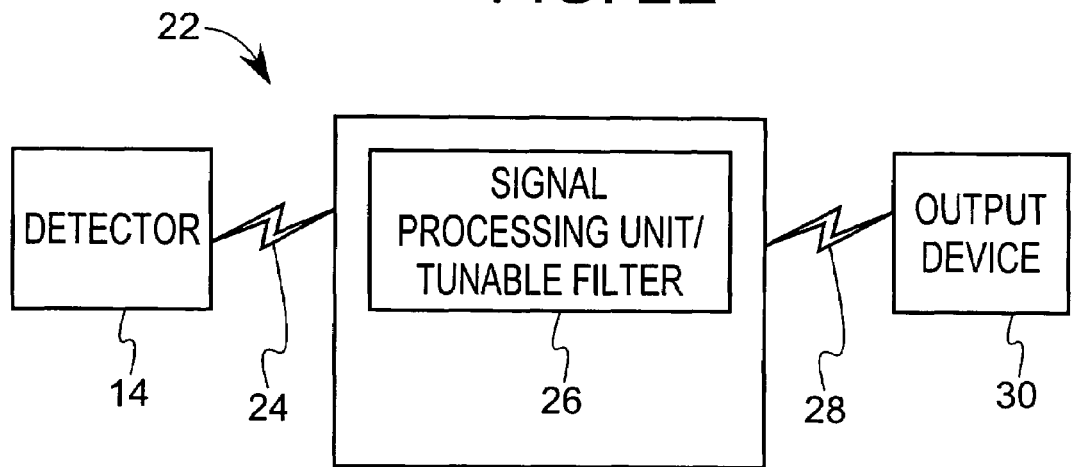
FIG. 2F is a block diagram of a device according to an embodiment of the present invention illustrating a detector, a signal processing unit and an output device, each remotely positioned and communicably coupled together.

Referring to FIG. 2E, the device 10 according to an embodiment of the present invention is arranged such that the detector 14 and output device 30 are both remotely positioned from the signal processing unit 26. For example, as shown, the detector 14 and output device 30 are arranged together in an integral assembly. The measurement signal 24 and output signal 28 are communicated back and forth between the devices. Referring to FIG. 2F, the device according to an embodiment of the present invention provides the detector 14, the signal processing unit 26 and the output device 30 each remotely located from one another.

Figure 2G:
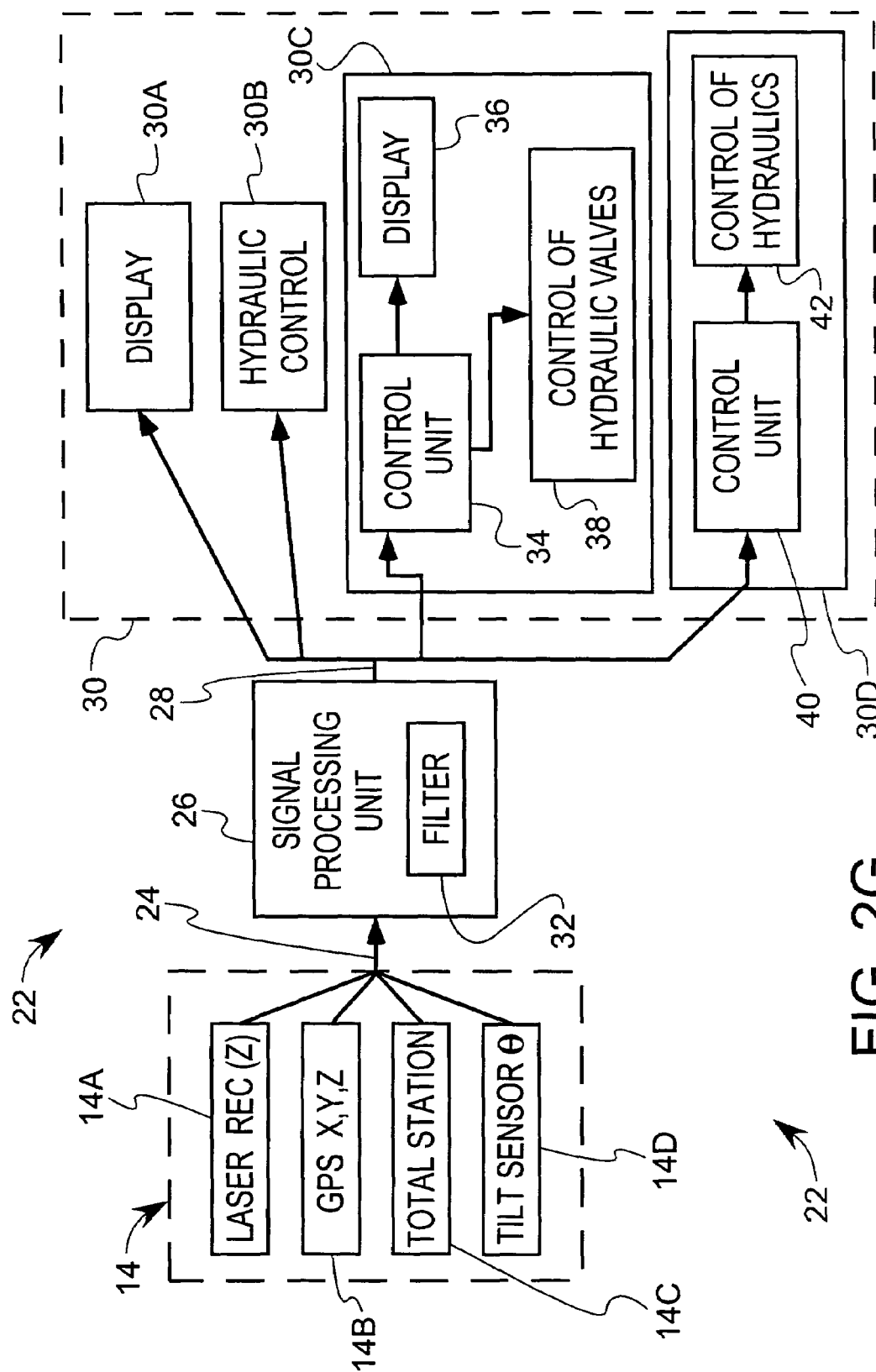
FIG. 2G is a block diagram of a device according to an embodiment of the present invention illustrating a variety of detector configurations and output configurations.

The configuration of the detector 14 will depend upon the type of measurement signals to be processed by the signal processing unit 26. Four illustrative detectors are shown in FIG. 2G, however, any one or more of the illustrated detectors may be implemented in a particular device 10 according to the present invention. Also, detector types other than those illustrated may be used with the various embodiments of the present invention. For example, the detector 14 may include a laser sensor 14A, which typically comprises a photodiode or photodiode array. The laser sensor 14A is configured to sense and provide angle or positional measurements detected from a laser transmitter. The detected laser signals are typically processed by the signal processing unit 26 to generate a one-dimensional Z-coordinate measurement.

As another example, the detector 14 may comprise a GPS sensor 14B configured to sense and provide positional measurements in up to three dimensions, such as providing X, Y, and Z-coordinate measurements derived from a global positioning satellite system. Another example includes a Total Station sensor 14C that is configured to sense and provide positional measurements in up to three dimensions, such as providing X, Y, and Z-coordinate measurements derived from a Total Station system. Still further, the detector may comprise a tilt sensor 14D configured to sense and provide acceleration or angular information (θ). The tilt sensor 14D can detect tilt information from an externally transmitted source, or the tilt sensor may be adapted to detect tilt of the device itself without the need for a separate transmitter.

The signal processing unit 26 provides the control electronics necessary to implement the desired functionality of the device. The signal processing unit generates the output signal 28 by processing the measurement signal 24 provided by the detector 14. The signal processing unit 26 may also optionally include or implement signal buffers, amplifiers, integrators, sample and hold circuits and other necessary circuits to condition the measurements 24. The signal processing unit 26 also carries out and/or controls the adaptive filtering of the measurement signal 24 via a programmable measurement filter 32. The signal processing unit 26 can include for example, any combination of analog and digital circuitry to implement the programmable measurement filter 32 and corresponding support logic.

The measurement signal 24 is processed by the programmable measurement filter 32 to produce a filtered measurement signal that is used by the signal processing unit 26 to produce the output signal 28. In generating the output signal 28, the signal processing unit analyzes available data including the measurement signal 24 to determine at least one filter parameter value therefrom. The programmable measurement filter 32 is dynamically programmed or tuned by the signal processing unit 26 based upon the determined filter parameter value(s) to achieve improved stability of the measurement signal 24. For example, for display applications, a more stable image is achieved. In control applications, a more stable control signal may be realized.

The type of output device 30 can vary depending upon the implementation of the device 10 and on the type of output signal 28 provided by the signal processing unit 26. Likewise, the output signal 28 will be adapted for the appropriate output device. For example, the signal processing unit 26 may manipulate the measurement signal 24 filtered by the programmable measurement filter 32 to generate the output signal 28 in a format suitable for a display 30A. The display 30A can be oriented integral with the device such as shown in FIG. 2B or the display 30A may be separately located from the device such as shown in FIG. 2C. The nature of the display will vary depending upon the type of measurement signal being processed. For example, a laser device for the construction industry may include a display that includes a scale for indicating the degree to which the device 10 is above or below the grade defined by a laser plane. A display for a GPS system may provide an alpha-numeric readout etc.

The output signal 28 may also provide information formatted suitably for use as a control or feedback signal for automated and semi-automated control systems. For example, the output signal 28 can be used with a hydraulic control 30B to operate or control hydraulic valves. The output signal 28 may also optionally include two components, a display signal routed to a display 30A and a feedback or control signal routed to a hydraulic control 30B.

As another alternative, the output signal 28 may comprise positional information that is passed to a control box 30C. At the control box 30C, the output signal 28 is communicably coupled to a control unit 34 that passes a suitable signal to a control box display 36 to display the output signal 28. The control unit 34 further generates an appropriate feedback control signal, which is coupled to control one or more hydraulic valves 38.

As still another exemplary alternative, the signal output 28 can comprise positional information that is communicably coupled to a control box 30D. The control box 30D includes a control unit 40 adapted to translate the positional information received at the control unit 40 into a suitable control feedback signal for control of one or more hydraulic valves 42 without actually providing any position information to a display.

Figure 3:
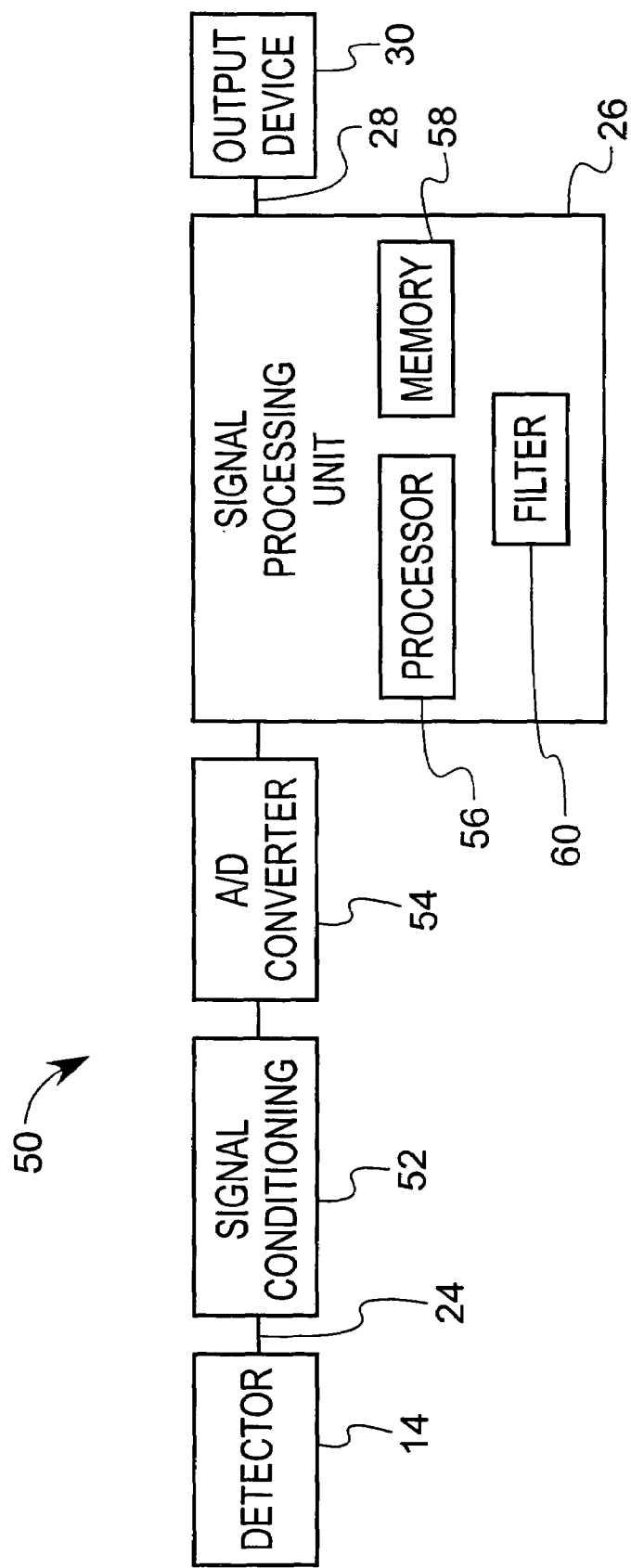
FIG. 3 is a block diagram of a device according to an embodiment of the present invention.

Referring to FIG. 3, a device block diagram 50 according to an embodiment of the present invention illustrates the programmable measurement filter implemented digitally. The detector 14 outputs a measurement signal 24 that is communicably coupled to the signal processing unit 26. The measurement signal 24 may be optionally conditioned at signal conditioning box 52. Signal conditioning may include any arrangement of gain adjustment, buffering, current or voltage conversion, or other typical processing. The measurement signal is further converted to a digital format via the analog to digital converter 54 prior to being processed and filtered by the signal processing unit 26. The signal processing unit 26 includes a processor 56, memory 58 adapted to store at least operational instructions and program code to execute the dynamically programmable digital measurement filter 60.

The signal processing unit 26 performs necessary processing and filtering, then provides an output signal 28 to the output device 30 as previously described. The signal processing unit 26 may comprise a central processing unit such as a microprocessor, or may be implemented for example, using specialized digital chips such as field programmable gate arrays, dedicated digital signal processing chips or other digital architectures.

The Programmable Measurement Filter

The signal processing unit 26 is operatively configured to analyze the measurement signal 24 and other available data and determine at least one filter parameter value therefrom. The filter parameter value may comprise a suitable value for any parameter associated with the type of measurement filter implemented. For example, a filter parameter value may comprise a filter constant for a digital filter implemented as a difference equation. A filter parameter value may also include for example, a cutoff frequency, bandwidth, Q-factor, gain, or a control signal adapted to affect a performance characteristic of the measurement filter. The signal processing unit 26 may also control multiple parameters of the measurement filter. For example, if the measurement filter is implemented as a Kalman filter, the filter parameter value may comprise the Q and/or R parameters.

According to an embodiment of the present invention, the signal processing unit 26 attempts to determine from the measurement signal 24 whether the measurement signal comprises "true" device movement, or whether the measurement contains noise. The signal processing unit 26 assigns a filter parameter a first predetermined value for detected movement, and a second predetermined value for noise. For example, the programmable measurement filter filters the measurement signal with a first bandwidth that is dynamically programmed by the signal processing unit when device movement is detected and the signal processing unit programs the measurement filter to operate at a second bandwidth when only noise is detected.

Figure 4:
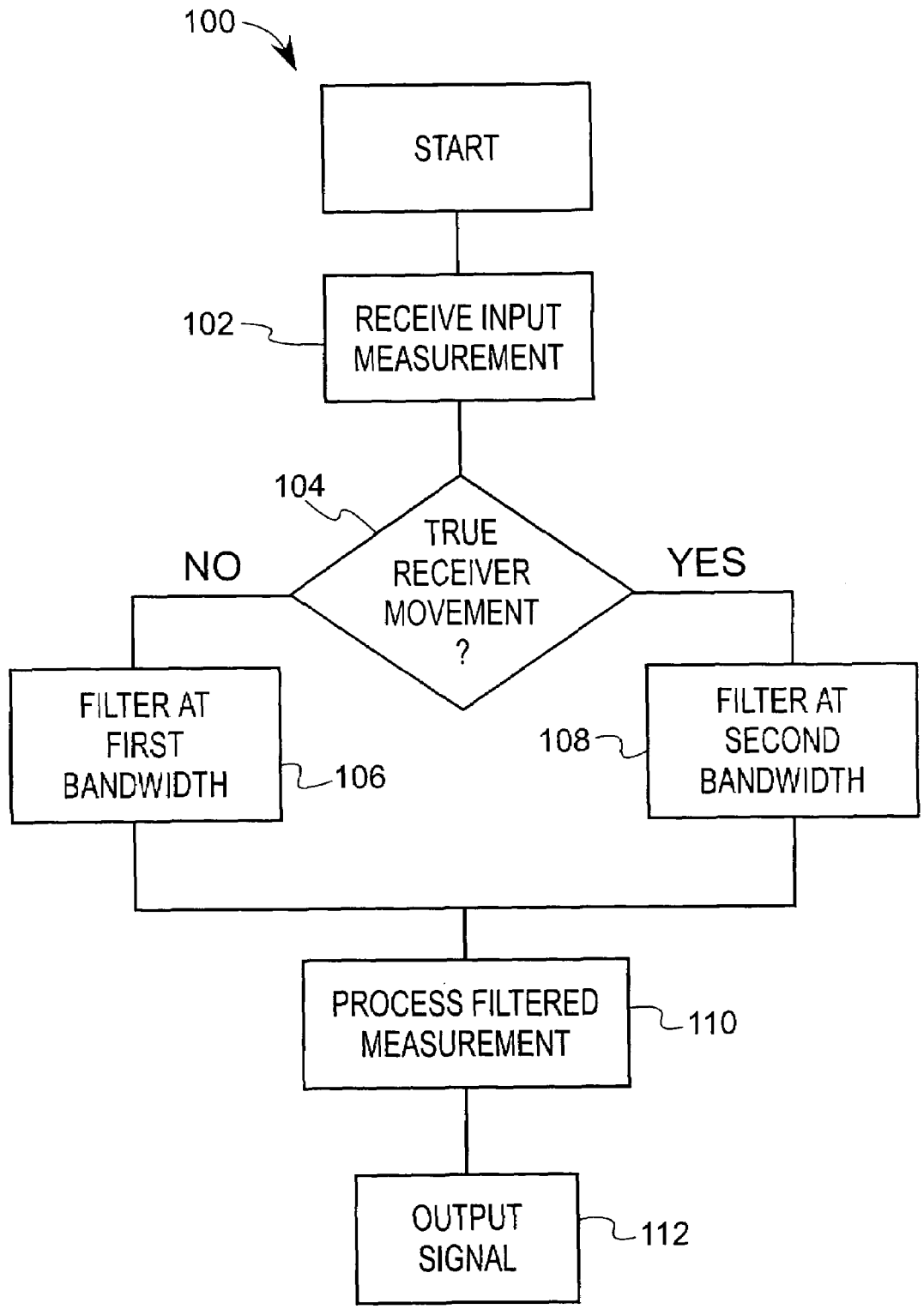
FIG. 4 is a flow chart illustrating a method for automatically tuning a device filter according to an embodiment of the present invention.

Referring to FIG. 4, a method 100 is provided for automatically tuning a programmable measurement filter. Initially, a measurement signal is received at 102. A determination is made as to whether the input measurement comprises noise or true device movement at 104. If the measurement signal is determined to be noise, the measurement signal is filtered using first filter characteristics at 106. For example, the measurement signal may be filtered at a relatively low bandwidth/relatively slower responsiveness to provide greater stability during the noisy conditions. If a true device movement is detected, the measurement signal is filtered using second filter characteristics at 108 where the second filter characteristics are different from the first filter characteristics. For example, the second filter characteristics may define a second bandwidth having higher/quicker responsiveness than the first bandwidth. The filtered measurement signal is then optionally processed at 110 to format the output signal into a suitable format and is output, for example, into a suitable display signal or a suitable control or feedback signal at 112. The signal processing unit variably programs the measurement filter to operate at a select one of the first or second filter characteristics to dynamically respond to changes in the measurement signal.

Where the programmable measurement filter is implemented digitally, it may be advantageous to accomplish the filtering in a computationally cost effective manner. For example, according to an embodiment of the present invention, the programmable measurement filter is digitally constructed using a two-element infinite impulse response (IIR) filter. The automated programmable nature of the present invention allows the programmable measurement filter to outperform moving window average and other current filter configurations that require between 2 and 4 times the memory locations for performing filtering.

Any variety of digital filtering may be used depending upon factors such as desired filtering smoothness, induced lag, and frequency response required of the output signal. For example, according to an embodiment of the present invention, measurement filter may be based upon a difference equation expressed generally as:

$$y(n)=\alpha*y(n-1)+(1-\alpha)x(n)$$

where $\alpha=e^{-2\pi f_c T}$, $f_c$ is the desired filter cutoff, and T is the sampling period of the system, which can be a measured or pre-set value.

For example, a laser device expecting to receive a 10 Hz laser signal is implemented with a dynamically tunable IIR lowpass filter that selects a relatively higher bandwidth, such as a filter having a cutoff frequency of approximately 1.1 Hz represented by the difference equation:

$$y(n)=0.5*y(n-1)+0.5*x(n)$$

when true device movement is detected, and a lower frequency bandwidth, such as a filter having a cutoff frequency of approximately 0.46 Hz represented by the equation:

$$y(n)=0.75*y(n-1)+0.25*x(n)$$

when the measurement signal comprises noise. In this case, the difference equations for the 1.1 Hz cutoff frequency and the 0.46 Hz cutoff frequency look similar with the exception of the filter constant $\alpha$. Accordingly, the signal processing unit can change the frequency of the programmable measurement filter merely by replacing the filter constant $\alpha$ in the difference equation to a value or either 0.5 or 0.75. Such may be accomplished by merely writing the filter constant value to a memory location. The coefficients are easily implemented with bit shifts implying factors of 2 scaling. To implement the measurement filter as a second order filter, the measurement signal can be processed by the difference equation twice.

Referring back to FIG. 3, the programmable measurement filter according to another embodiment of the present invention comprises a filter designed to have a filter bandwidth minimum, a filter bandwidth maximum, and optionally one or more intermediate filter bandwidths. The signal processing unit 26 assigns a filter parameter value that is used to select the desired filter bandwidth from within the operational range of filter bandwidths based upon any number of conditions. For example, the filter bandwidth may be dynamically programmed to reflect the likelihood that the measurement signal 24 comprises true device movement.

Figure 5:
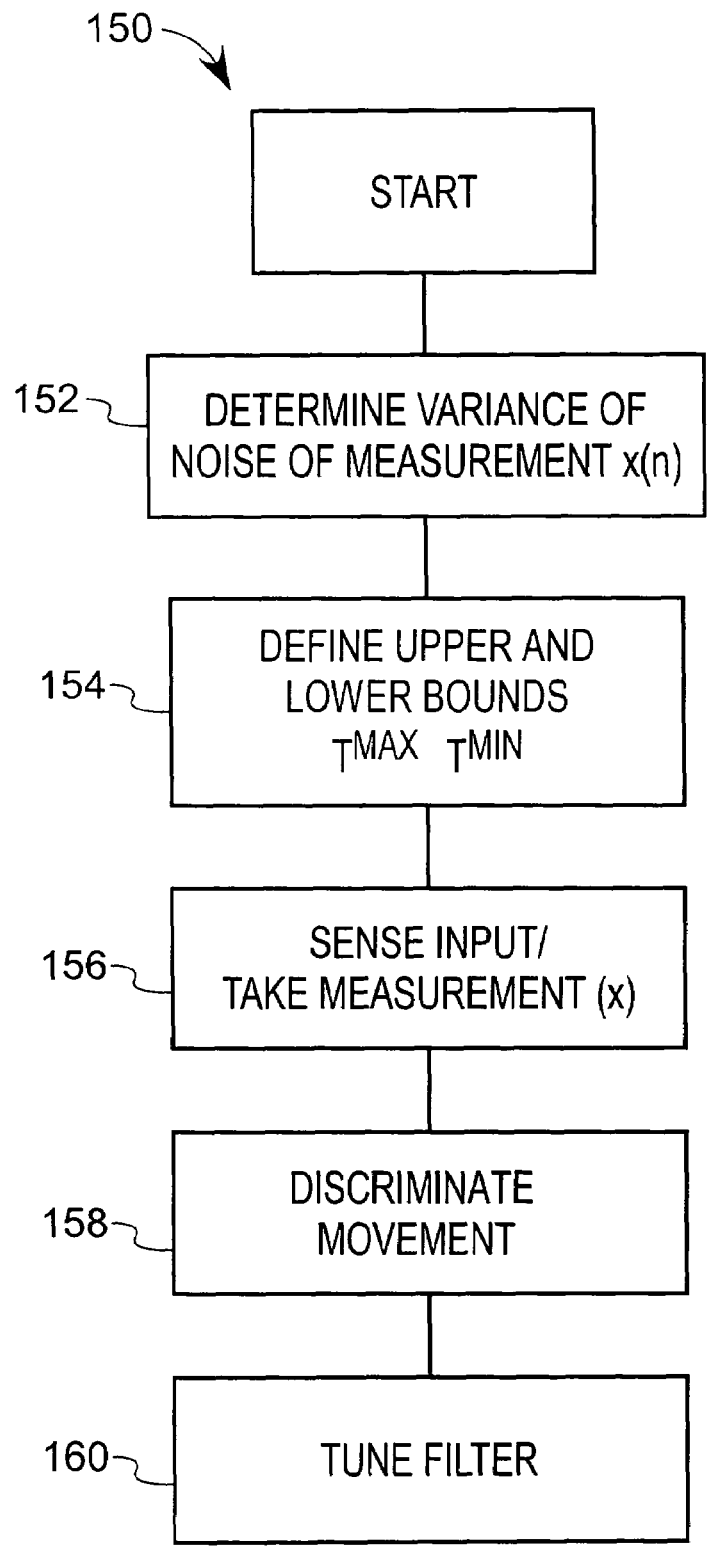
FIG. 5 is a flow chart illustrating a method for automatically tuning a device filter according to another embodiment of the present invention.

For example, the digitally implemented measurement filter discussed above may also be designed to have one or more intermediate bandwidths. For example, the filter constant can be selected in the range $0.5 \leq \alpha \leq 0.75$. Referring to FIG. 5, a method 150 is provided for dynamically tuning the measurement filter. A variance $\sigma$ of the noise associated with the measurements of interest is optionally determined at 152. For example, the variance $\sigma$ may be determined a priori and may be tailored to specific applications or circumstances. An upper and lower bounds Tmax and Tmin may also be optionally identified at 154. The upper and lower bounds Tmax and Tmin preferably take into account the variance $\sigma$ of the noise associated with the measurements of interest and may also be affected by other factors such as acceptable measures of lag versus accuracy of measurement and operating frequency of the device.

A measurement signal is received at 156, an attempt is made to discriminate device movement compared to noise at 158 and the programmable measurement filter is tuned at 106. Any number of techniques may be used to distinguish actual or true movement from noise. For example, according to an embodiment of the present invention, an attempt is made to determine how likely it is that a true movement is or is not taking place at 158. A processor determines the probability that true movement is or is not occurring. The measurement signal is then filtered, preferably within the upper and lower bounds determined at 154, based upon the probability that true device movement has occurred at 160. For example, the signal processing unit can modify the operational characteristics of the programmable measurement filter to behave approaching Tmax as the likelihood of true movement increases. Likewise, the operational characteristics of the measurement filter may be tuned approaching Tmin as the likelihood of noise increases.

Discriminating Device Movement From Noise

Figure 6:
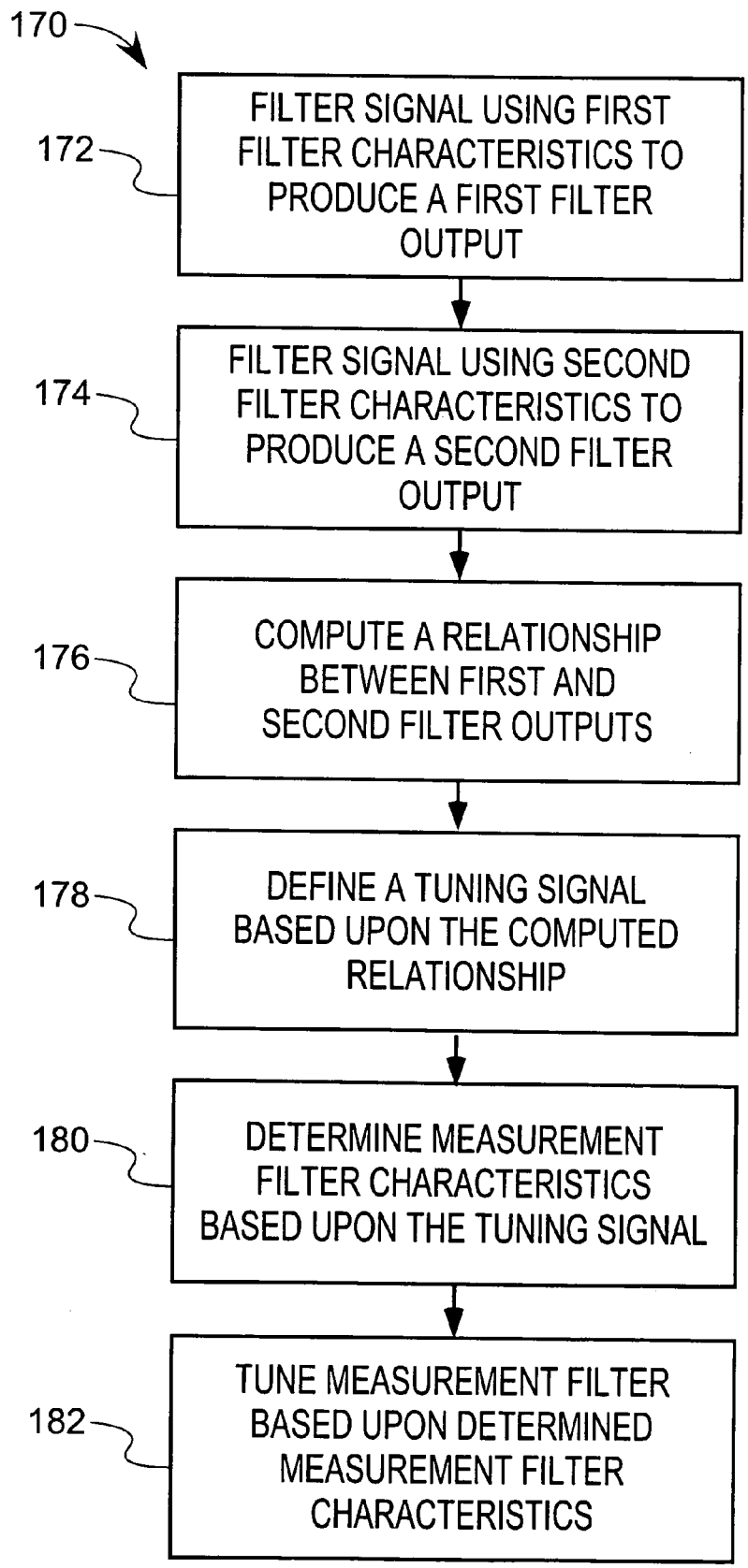
FIG. 6 is a flow chart illustrating an approach to automatically tuning a device filter according to an embodiment of the present invention.

As pointed out above, any number of approaches can be used to discriminate movement from noise. For example, referring to FIG. 6, a method 170 for automatically tuning a measurement filter according to an embodiment of the present invention is illustrated.

A measurement signal is filtered using first filter characteristics to produce a first filtered output at 172. The measurement signal is also filtered using second filter characteristics to produce a second filter output at 176. A relationship between the first and second filter outputs is established at 176 and a tuning signal is defined at 178 based upon the established relationship between the first and second filter outputs. The tuning signal preferably discriminates device movement from noise, or alternatively, provides a likelihood that true device movement is or is not occurring. Measurement filter characteristics are determined based upon the tuning signal at 180 and the measurement filter is tuned at 182 based upon the determined measurement filter characteristics.

The measurement filter output can be formatted for a display device, or for a control application. Further, the tuning signal can be used as a feedback control for automated control applications. Still further, both the tuning signal and the measurement filter output can be used as feedback signals for control applications.

Figure 7:
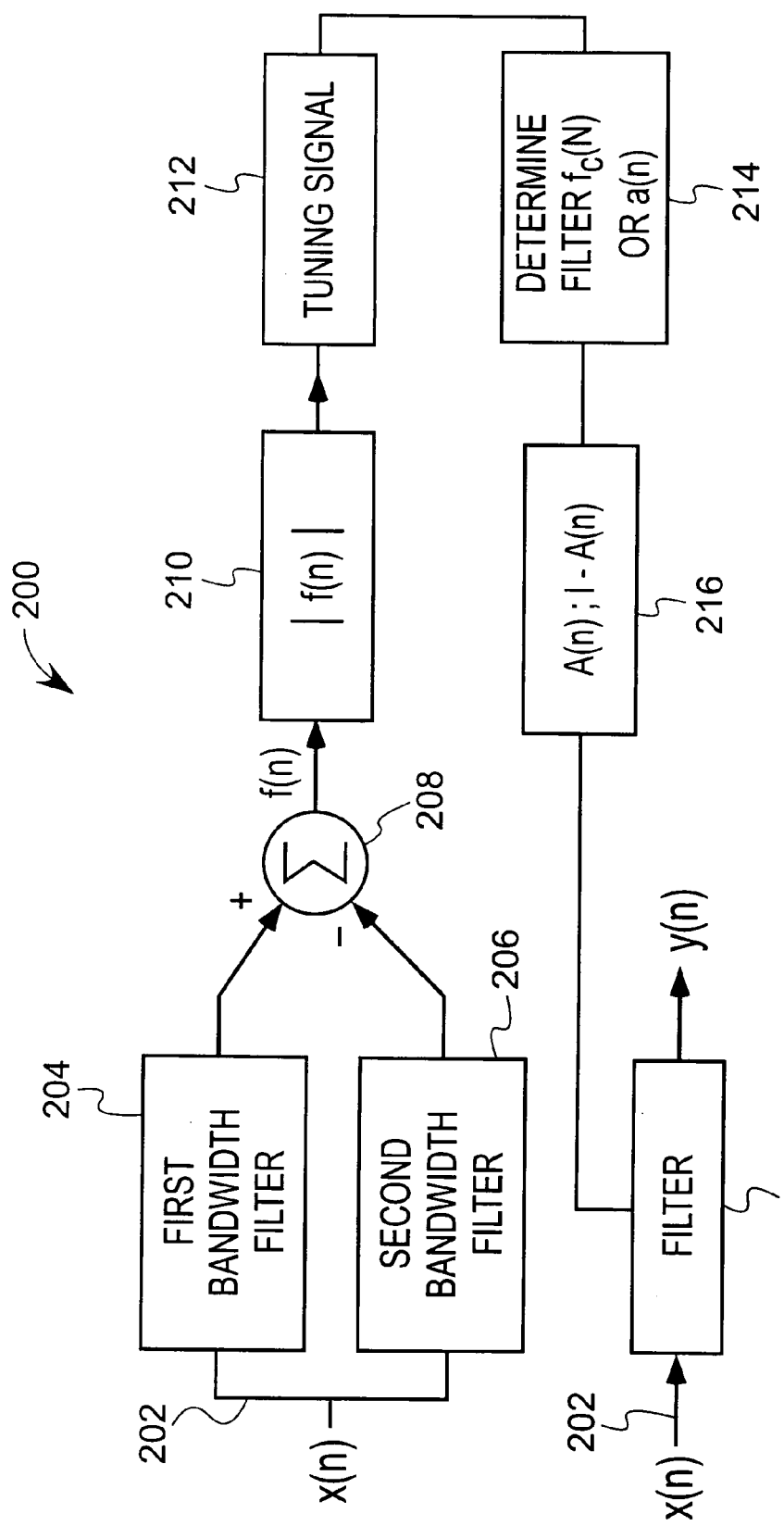
FIG. 7 is a block diagram illustrating an approach to automatically tuning a device filter according to the flow chart of FIG. 6.

Referring to FIG. 7, a block diagram of a system 200 is provided for automatically tuning the programmable measurement filter according to the method 170. A measurement signal 202, such as from a detector, is input in parallel to a first filter 204 having a first bandwidth and to a second filter 206 having a second bandwidth different from the first bandwidth.

The first and second filters 204, 206 may comprise first or higher order filters. According to an embodiment of the present invention, the first filter 204 comprises a median filter. A median filter has the capability of preserving discontinuities of the input signal, while at the same time eliminating 'flutter' about the core energy of the signal. The median filter can provide an effective filter even with a small number of samples. For example, the median filter may only look at three samples. Compared to a 2-pole lowpass filter with a relatively low cutoff frequency, the median filter does not have significant lag. The median filter output does not necessarily trend to the true mean of the signal, but the median filter output may trend near the mean assuming that the noise is fairly random and symmetric, and that the resolution of the system is adequate.

According to an embodiment of the present invention, the second filter 206 is constructed as a lowpass filter. A lowpass filter such as a 2-pole lowpass filter with a low cutoff can be designed to preserve and approach the mean value of the signal. The lower the output bandwidth, the better the lowpass filter is at detecting the mean over time. However, the cost associated with the precision of detecting the mean is a time lag associated with the lowpass filter output.

If the device undergoes movement relative to a transmitter, such as a vertical displacement, the median filter will detect the movement in a time equal to half of the median window width. The filter such as a second order lowpass filter with a low cutoff will also track the vertical displacement of the device, however, the lowpass filter will track the vertical displacement of the device based upon an exponential curve and will have an output that lags behind the output of the median filter.

If on the other hand, the measurement signal comprises only a noise component such as may occur from noise such as wind gusts, beam bounce, electronic noise and vibration, the output of the median filter will closely match the output of the 2-pole filter with a low cutoff.

Thus the difference in the output of the first and second filters 204, 206 can be used as a measure to quantify how likely it is that a 'true' movement is or is not taking place. The larger the difference between the filter output of the median filter and the lowpass filter, the more likely it is that the input sensed by the detector comprises true movement, thus the input is preferably filtered by the programmable measurement filter at a higher bandwidth for tracking movement. The smaller the difference between the median filter and the lowpass filter, the more likely it is that the input comprises noise and is preferably filtered by the programmable measurement filter at a lower bandwidth to reduce or eliminate the detected noise.

The outputs from the first and second filters 204, 206 are subtracted by the summer 208 to produce a difference signal. The absolute value processor 210 determines the magnitude of the difference signal. The output from the absolute value processor 210 defines a tuning signal 212. Filter parameters are derived at 214 and 216 and the filter parameters are used to tune the programmable measurement filter 218. As such, the tuning signal output can be used to dynamically drive the desired filter parameter value. For example, the tuning signal output may be compared to threshold values or used in any number of computations or lookups to determine the filter parameter values necessary to suitably tune the measurement filter. The tuning signal 212 may also be used as a feedback signal for control applications.

According to an embodiment of the present invention, the system 200 including the programmable measurement filter is implemented in software. The programmable measurement filter is implemented using a difference equation to implement an infinite impulse response filter having a low-pass function. The tuning signal 212 is thus used to derive the necessary filter parameter values to tune the cutoff frequency of the measurement filter to obtain a desired frequency response. For example, a difference equation such as:

$$y(n)=\alpha(n-1)*y(n-1)+((1-\alpha(n-1))*x(n-1))$$

may be digitally implemented in software where $\alpha(n)=e^{-2\pi f_c(n)T_s}$. Also, let $f_c(n)$ represent the desired filter cutoff, and $T_s$ is the sampling period of the system, which can be a measured or pre-set value. Using the above difference equation to implement the measurement filter, the cutoff frequency can be tuned by altering the filter constant $\alpha$ used by the difference equation.

There are a number of ways that the filter constant $\alpha$ can be computed. One manner is to determine a suitable low bandwidth filter and a suitable high bandwidth filter, compute the filter parameter values for each, and use the tuning signal to select between one of the two available filter parameter values.

Another alternative is to determine a suitable low bandwidth filter and a suitable high bandwidth filter, and use the tuning signal to derive filter parameters that result in a filter between high bandwidth and low bandwidth filters, but also allow one or more intermediate bandwidths. The transition between the minimum or low bandwidth and maximum or high bandwidth can be linear or nonlinear. The actual frequency values for the high bandwidth filter and low bandwidth filter will vary depending upon the application. The frequency values may also take into account factors such as the variance $\sigma$ of the noise associated with the measurements of interest.

A first example is to design the tunable filter such that the filter constant varies linearly between a minimum value and a maximum value. That is, $\alpha^{min} \leq \alpha(n) \leq \alpha^{max}$. Let $\alpha^{min}$ define a filter constant that when implemented in the programmable measurement filter will produce a filter output having a predetermined highest bandwidth. As such, $\alpha^{min}$ will also be denoted as $\alpha^{highbandwidth}$. Likewise, let $\alpha^{max}$ define a filter constant that when implemented in the programmable measurement filter will produce a filter output having a predetermined lowest bandwidth. As such, $\alpha^{max}$ will also be denoted as $\alpha^{lowbandwidth}$. In this nomenclature, $\alpha^{highbandwidth} < \alpha^{lowbandwidth}$. Also, let the tuning signal, denoted T(n) be bound by a minimum and maximum such that $T^{min} \leq T(n) \leq T^{max}$. The tuning signal T(n) can have any arbitrary or meaningful range, but is preferably associated with a variance ($\sigma$) associated with the noise of the input.

Given the above defined restraints, the filter constant $\alpha(n)$ can be assigned a generally linear relationship to the tuning signal T(n) by the expressions:

$$\alpha(n) = \alpha^{highbandwidth} \text{ for } T(n) > T^{max}$$
$$\alpha(n) = \alpha^{lowbandwidth} \text{ for } T(n) < T^{min}$$
$$\alpha(n) = \frac{(\alpha^{highbandwidth} - \alpha^{lowbandwidth})(T(n) - T^{min})}{T^{max} - T^{min}} + \alpha^{lowbandwidth}$$

Likewise, a frequency characteristic such as the cutoff frequency can be designed to vary linearly between the low bandwidth and high bandwidth limits. Under this approach, $f_c^{highbandwidth} > f_c^{lowbandwidth}$ and $$f_c(n) = f_c^{highbandwidth} \text{ for } T(n) > T^{max}$$
$$f_c(n) = f_c^{lowbandwidth} \text{ for } T(n) < T^{min}$$
$$f_c(n) = \frac{(f_c^{highbandwidth} - f_c^{lowbandwidth})(T(n) - T^{min})}{T^{max} - T^{min}} + f_c^{lowbandwidth}$$

Once the cutoff frequency $f_c(n)$ is computed, the filter constant $\alpha(n)$ can be determined.

A one pole adaptive filter response y(n) with unity dc gain can then be constructed using the position measurement x(n) and filter constant $\alpha(n)$ according to the difference equation:

$$y(n)=\alpha(n-1)*y(n-1)+((1-\alpha(n-1))*x(n-1)) \text{ where}$$
$$0 \leq \alpha \leq 1.$$

In the above equation, the filter constants $\alpha$ and $(1-\alpha)$ are used to preserve unity gain operation. The signal processing unit could alternatively compute two different filter constants $\alpha$ and $\beta$ where $\beta$ is substituted for the filter constant $(1-\alpha)$ if the particular application so warrants, for example, where non unity gain filtering is desired.

Although the forward looking rectangular approximation of the discrete time integrator is expressed above, other approximations including backward looking and trapezoidal approximations may be used. Further, any order filter can be constructed depending upon the application, resources available, and the ability of the processor to afford the cost associated with the increased computational burden of more elaborate filtering. For example, a second order filter may be realized by processing the measurement signal through the above difference equation, then processing the filtered measurement signal through the difference equation a second time.

Also, although IIR filters are described herein, other filter types, examples of which may include finite impulse response filters (FIR) (with or without windowing), raised-cosine, raised root cosine, linear phase, Gaussian (lowpass), Kalman, median, mean, and averaging filters may be used as well. Further, although lowpass filters are discussed above, any digital filter types such as lowpass, highpass, bandpass, or notch filters can be implemented with an appropriate difference equation as the application dictates.

Control Applications

The various embodiments of the present invention may also be used to provide feedback control signals for automated processes. For example, the filtered measurement signal may be used to control hydraulic valves used to adjust the height of a blade on an earthmoving machine for grade applications. Under such an operation, real time control of the hydraulics is important to obtain and maintain proper grade. However, excessive phase lag caused by filtering the measurement signal may limit the ability of the hydraulic control to quickly respond to detected changes in grade.

Figure 8:
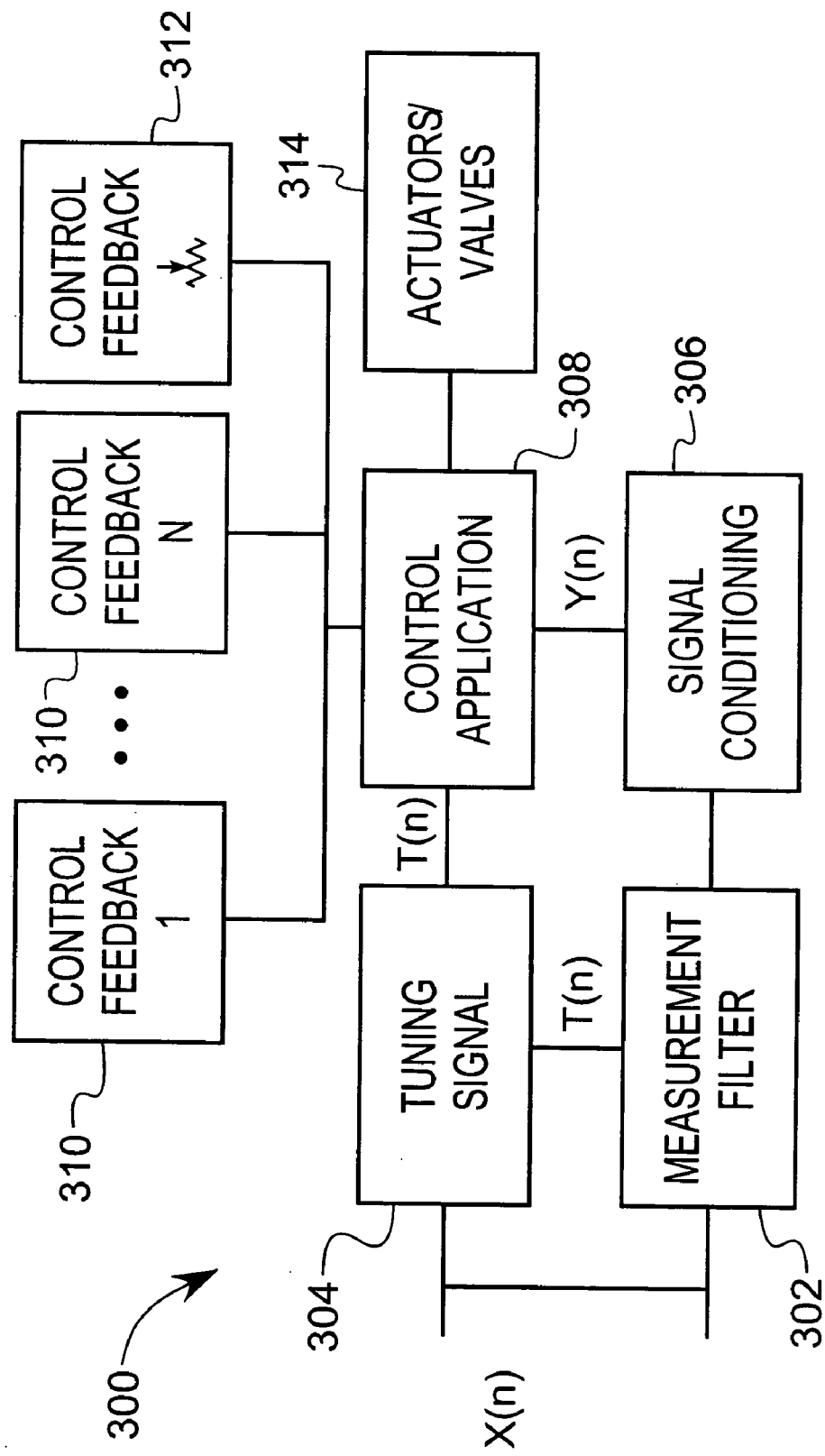
FIG. 8 is a block diagram of a control application capable of adapting to changes in phase lag according to an embodiment of the present invention.

Referring to FIG. 8, a system 300 is provided for compensating for the phase lag change of the measurement filter for control applications according to an embodiment of the present invention. A measurement signal X(n) is provided to a tunable measurement filter 302. The measurement filter is tuned by the tuning signal output T(n) provided by a first processor such as a tuning signal unit 304 to produce a filtered measurement signal output. The tuning signal unit 304 produces a tuning signal output T(n) that dynamically changes in response to predetermined conditions. For example, the tuning signal unit 304 may comprise a signal processing unit adapted to compute a tuning signal based upon the measurement signal X(n) as described with reference to FIGS. 6 and 7. The filtered measurement signal output may optionally require conditioning, such as provided by the signal conditioning unit 306 to suitably format the filtered measurement signal output for the intended control application. At least one of the tuning signal T(n) and the filtered measurement signal output Y(n) are provided to the control application 308.

The control application 308 then uses the appropriate signals to accommodate for phase lag. For example, the filtered measurement signal output Y(n) may be suitably formatted as a position signal. As such, the position signal is designated Y(n). The control application 308 uses the position signal Y(n) and/or the tuning signal T(n) to selectively switch among two or more discrete control feedbacks 310. This arrangement may be useful for example, where the control application 308 utilizes discrete filter types or distinct filters for each of the 1 through N control feedbacks where N is any integer greater than 1. Alternatively, the 1 through N discrete feedbacks 310 may be replaced with a continuously variable feedback 312. Under such an arrangement, the tuning signal T(n) and/or the position signal Y(n) are used to tune the continuously variable feedback 312 to compensate for changes in phase lag of the system. The control application 308 is controllably coupled to one or more controllers 314 such as actuators and/or valves to perform the desired control function.

There are a number of ways that the control application 308 may use the tuning signal T(n) and/or the position signal Y(n) to control the feedbacks to accommodate for phase lag. The output of two or more controllers 314 may be manipulated based upon the tuning signal T(n) or position signal Y(n). For example, the output of two or more controllers may be added in proportion to the selection of the tuning signal T(n) and/or position signal Y(n) used.

As another example, many current hydraulic control systems use an industry standard proportional-integral-derivative (PID) control algorithm. The tuning signal T(n) and/or the position signal Y(n) are used by the control application 308 to switch one or more PID constants to compensate for changes in phase lag of the system. For example, in certain control applications, the integral gain is not required since the hydraulics act as integrators. Rather, the proportional gain (P-gain) is the main driving element for the control system. The tuning signal T(n) and/or position signal Y(n) are used by the control application 308 to dynamically adjust the constant that affects the P-gain. While PID control algorithms are widely used, the present invention may be practiced with other control models such as feed forward compensation algorithms, intelligent learning control paradigms. Further, the present invention is not limited to hydraulic control applications. Rather, the present invention may be practiced with any practical actuator technology.

Having described the invention in detail and by reference to preferred embodiments thereof, it will be apparent that modifications and variations are possible without departing from the scope of the invention defined in the appended claims.

What is claimed is:

1. A device for a spatial positioning system comprising:
   a detector adapted to detect a measurement signal;
   a signal processing unit communicably coupled to said detector, said signal processing unit adapted to analyze said measurement signal and determine at least one filter parameter value therefrom, wherein said signal processing unit compares a first filter output of a first filter to a second filter output of a second filter where said first and second filters have at least one different filter characteristic to discriminate device movement from noise detected by said detector and said signal processing unit further comprising a programmable measurement filter adapted to receive and filter said measurement signal based upon said at least one filter parameter value determined by said signal processing unit; and
   an output device coupled to said signal processing unit.

2. The device according to claim 1, wherein said signal processing unit selects a first filter parameter value from at least two predetermined filter parameter values.

3. The device according to claim 2, wherein said signal processing unit selects said first filter parameter value based upon an attempt to discriminate device movement from noise in said measurement signal.

4. The device according to claim 2, wherein said signal processing unit is adapted to compute said at least one filter parameter value such that a frequency characteristic of said programmable measurement filter varies linearly within a predetermined operational range.

5. The device according to claim 2, wherein said signal processing unit is adapted to compute at least one filter parameter value that varies linearly within a predetermined operational range.

6. The device according to claim 2, wherein said signal processing unit selects a first filter parameter value from within a range of operational values based upon a likelihood that said measurement signal represents device movement compared to noise.

7. The device according to claim 1, wherein said programmable measurement filter comprises a programmable low pass filter having a cut off frequency determined at least in part, by said at least one filter parameter value provided by said signal processing unit.

8. The device according to claim 7, wherein said signal processing unit selects a first filter parameter value between at least two predetermined filter values.

9. The device according to claim 8, wherein said first parameter value is selected such that said programmable low pass filter has a first cutoff frequency in response to detected device movement and a second cutoff frequency different from said first cutoff frequency in response to detected noise.

10. The device according to claim 7, wherein said signal processing unit is adapted to compute said at least one filter parameter value such that said cutoff frequency of said programmable measurement filter varies linearly within a predetermined operational range.

11. The device according to claim 7, wherein said signal processing unit is adapted to compute at least one filter parameter value that varies linearly within a predetermined operational range.

12. The device according to claim 1, wherein each of said first and second filters processes said measurement signal.

13. The device according to claim 1, wherein said first filter comprises a median filter and said second filter comprises a low pass filter.

14. The device according to claim 1, wherein said programmable measurement filter is implemented digitally as software code and said signal processing unit communicates said at least one filter parameter value to said programmable measurement filter by storing said at least one filter parameter value in a storage location of a storage device accessible by a processor executing said software code.

15. The device according to claim 14, wherein said processor is a component of said signal processing unit.

16. The device according to claim 1, wherein said programmable measurement filter filters said measurement signal to produce a filtered output signal that is coupled to a display device.

17. The device according to claim 1, wherein said programmable measurement filter filters said measurement signal to produce a filtered output signal that is coupled to an automated control device.

18. The device according to claim 1, wherein said programmable measurement filter filters said measurement signal to produce a filtered output signal that is manipulated to compute a control signal to control an automated control device.

19. The device according to claim 1, wherein said measurement signal comprises at least one of an angular measurement, a detected laser signal, a detected global positioning signal, and a detected automated tracking system signal.

20. The device according to claim 1, wherein said measurement signal is communicated from said detector to said signal processing unit using a wireless communications link.

21. The device according to claim 20, wherein said wireless communications link comprises a wireless radio link.

22. A device for a spatial positioning system comprising:
a detector adapted to detect a measurement signal;
a first filter communicably coupled to said detector and arranged to filter said measurement signal, said first filter having a first filter output;
a second filter communicably coupled to said detector and arranged to filter said measurement signal, said second filter having a second filter output;
a signal processing unit communicably coupled to said detector, said signal processing unit adapted to analyze said measurement signal and determine at least one filter parameter value based at least partially from an analysis of said first and second filter outputs;
a storage device located within said signal processing unit for storing said at least one filter parameter value;
a programmable measurement filter adapted to receive and filter said measurement signal based upon said at least one filter parameter value retrieved from said storage device of said signal processing unit; and
an output device coupled to said signal processing unit.

23. A method of filtering a measurement signal in a device for a spatial positioning system comprising:
analyzing a measurement signal from a detector of said device;
filtering said measurement signal by a first filter to produce a first filter output and by a second filter to produce a second filter output;
discriminating whether said measurement signal comprises movement of said device or comprises noise based at least partially on said first and second filter outputs;
determining at least one filter characteristic based upon whether said measurement signal is determined to be noise or device movement;
automatically tuning a programmable measurement filter based upon said at least one filter characteristic; and
filtering said measurement signal using said programmable measurement filter.

24. A method of filtering a measurement signal in a device for a spatial positioning system comprising:
providing a detector adapted to detect a measurement signal;
communicably coupling a first filter to said detector and arranged to filter said measurement signal, said first filter having a first filter output;
communicably coupling a second filter to said detector and arranged to filter said measurement signal, said second filter having a second filter output;
communicably coupling a signal processing unit to said detector, wherein said signal processing unit compares said first filter output to said second filter output where said first and second filters have at least one different filter characteristic to discriminate device movement from noise detected by said detector;
analyzing said first and second filter outputs to derive at least one filter parameter value; and
tuning a programmable measurement filter based upon said at least one filter parameter value determined by said signal processing unit.

25. The method according to claim 24, further comprising selecting said filter parameter value based upon an attempt to discriminate device movement from noise in said measurement signal.

26. The method according to claim 24, further comprising determining a likelihood that said measurement signal represents device movement compared to noise and assigning said at least one filter parameter value based upon said likelihood.

27. The method according to claim 24, wherein said at least one filter parameter value is selected such that a frequency characteristic of said programmable measurement filter varies linearly within a predetermined operational range.

28. The method according to claim 24, wherein said at least one filter parameter value varies linearly within a predetermined operational range.

29. The method according to claim 24, wherein said at least one parameter value is selected such that said programmable measurement filter implements a low pass filter having a first cutoff frequency in response to detected device movement and a second cutoff frequency different from said first cutoff frequency in response to detected noise.

* * * * *

UNITED STATES PATENT AND TRADEMARK OFFICE
CERTIFICATE OF CORRECTION

PATENT NO. : 7,079,987 B2 Page 1 of 1
APPLICATION NO. : 11/010468
DATED : July 18, 2006
INVENTOR(S) : Francisco R. Green It is certified that error appears in the above-identified patent and that said Letters Patent is hereby corrected as shown below:

Col. 9, line 27, "106." should read -- 160. --

Col. 11, line 22, "$2nf^{(n)Ts}$" should read -- $2nf_c^{(n)Ts}$ --

Signed and Sealed this

Fourth Day of September, 2007

JON W. DUDAS
*Director of the United States Patent and Trademark Office*